United States Patent [19]

Hollow

[11] Patent Number: 4,591,772
[45] Date of Patent: May 27, 1986

[54] LOAD POSITIONING SYSTEM WITH GRAVITY COMPENSATION

[75] Inventor: Richard H. Hollow, Sunnyvale, Calif.

[73] Assignee: The United States of America as represented by the Administrator of the National Aeronautics and Space Administration, Washington, D.C.

[21] Appl. No.: 681,041

[22] Filed: Dec. 12, 1984

[51] Int. Cl.4 ............................................ G05D 23/275
[52] U.S. Cl. ........................................ 318/632; 318/8; 318/48; 318/663
[58] Field of Search ................. 318/48, 632, 8, 5, 663, 318/625

[56] References Cited

U.S. PATENT DOCUMENTS

| | | | |
|---|---|---|---|
| 2,415,679 | 2/1947 | Edwards et al. | 318/48 X |
| 2,789,260 | 4/1957 | Curtis et al. | |
| 3,408,868 | 11/1968 | Shaughnessy | |
| 3,434,025 | 3/1969 | Parkinson et al. | 318/48 X |
| 3,771,032 | 11/1973 | Hender | 318/48 X |
| 3,854,378 | 12/1974 | Vogel | |
| 4,022,064 | 5/1977 | Preston | |
| 4,126,818 | 11/1978 | Taylor | 318/48 X |
| 4,301,528 | 11/1981 | Leri | |
| 4,323,828 | 4/1982 | Terada et al. | 318/48 X |
| 4,373,147 | 2/1983 | Carlson, Jr. | 318/48 |
| 4,375,047 | 2/1983 | Nelson | 318/48 |

Primary Examiner—B. Dobeck
Attorney, Agent, or Firm—Darrell G. Brekke; John R. Manning; Robert D. Marchant

[57] ABSTRACT

A load positioning system with gravity compensation has a servo-motor (12), position sensing feedback potentiometer (38) and velocity sensing tachometer (42) in a conventional closed-loop servo arrangement to cause lead screw (14) and ball nut (20) to vertically position load (22). Gravity compensating components comprise the DC motor (32), gears (34) and (36), which couple torque from motor (32) to the lead screw (14), and constant-current power supply (37). The constant weight of the load (22) applied to the lead screw (14) via the ball nut (20) tends to cause the lead screw (14) to rotate, the constant torque of which is opposed by the constant torque produced by motor (32) when fed from the constant-current source (37). The constant current is preset as required by potentiometer (54) to effect equilibration of the load (22) which thereby enables the positioning servo-motor (12) to "see" the load (22) as weightless under both static and dynamic conditions. Positioning acceleration and velocity performance are therefore symmetrical.

6 Claims, 5 Drawing Figures

LOAD POSITIONING SYSTEM WITH GRAVITY COMPENSATION

DESCRIPTION

Origin of the Invention

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to load positioning systems used for moving a load in a gravity field and particularly to apparatus for compensating for the gravity force in a manner permitting symmetrical load acceleration and velocity with low cost, weight and space penalties.

2. Description of the Prior Art

In load positioning systems it is known to compensate for the effects of gravity on the load by means of a counterbalance or counterweight, a constant-force spring, or a pneumatic equilibrator.

A counterweight is often undesirable due to its large size or to the weight/inertia that it adds to the system. For example, in a typical three degrees-of-motion system with X, Y and Z axes, the mass of the Z counterweight often degrades the performance of either or both of the X and Y drives, which leads to the necessity for more power. Additional power translates to more apparatus cost, weight, and volume.

In many situations a constant force spring is not capable of generating a sufficient compensating force. These springs have innately high stresses which induce metal fatigue. Consequently, the springs have a relatively short dynamic life span.

The disadvantage of pneumatic equilibrators is that they are long and bulky and generally have to be made on a custom basis.

In a load positioning system with a servomechanism it is known to bias the servo amplifier in an attempt to compensate for the force of gravity. This procedure is not optimum inasmuch as it only reduces the steady-state error. When the bias is added, the maximum acceleration and maximum velocity remain asymmetrical—that is, the acceleration and the velocity in the direction opposite the gravity vector are less than the acceleration and the velocity in the direction of the gravity vector. Motor selection must therefore be made according to the performance demands of the worst case. This results in greater apparatus cost, volume and weight.

A limited scale patent search on the subject invention uncovered these patents, not one of which even recognizes the problem solved by the present invention. U.S. Pat. Nos. 4,105,961; 4,200,828; and 4,301,528 disclose phonograph arms wherein motors are utilized to adjust styli forces and facilitate groove tracking. Gravity measuring devices are described in U.S. Pat. Nos. 3,408,868; 3,991,625; and 4,022,064. U.S. Pat. No. 3,854,378 discloses an apparatus for stabilizing an oscillating mass such as an artillery gun and U.S. Pat. No. 2,789,260 sets forth a device for electronically indicating deviation from the earth's gravity vector.

SUMMARY OF THE INVENTION

Accordingly, it is an object of this invention to provide a load positioning system having symmetrical velocity and acceleration performance through an improved gravity compensation means.

It is another object of the invention to provide such a load positioning system wherein the power demand of the primary drive means is minimized.

It is a further object to provide a load positioning system in which symmetrical velocity and acceleration performance is achieved with gravity compensation apparatus that is less expensive and/or lighter weight and/or more compact than prior gravity compensation devices.

It is still further an object of the invention to provide a load positioning system wherein electromechanical means apart from the primary drive means are employed to cancel the force on the load induced by gravity.

The attainment of these and related objects may be achieved through the use of the novel load positioning system herein disclosed. Generally, in accordance with the invention, a primary drive means, such as a motor, is mechanically coupled to the load to be positioned. The torque imposed on the coupling means as a result of gravity is counteracted with an equal and opposite torque generated by a second motor. In practice, the second motor, the gravity compensating motor, need not generate as much torque as the primary motor. By eliminating the effect of gravity-induced torque in this manner, the load positioning motor effectively "sees" a weightless load under both static and dynamic conditions and the load positioning motor is permitted symmetrical velocity and acceleration performance.

For further comprehension of the invention, and of the objects and advantages thereof, reference will be made to the following description and accompanying drawings and to the appended claims in which the various novel features of the invention are more particularly set forth.

DETAILED DESCRIPTION OF THE INVENTION

Figure 1:
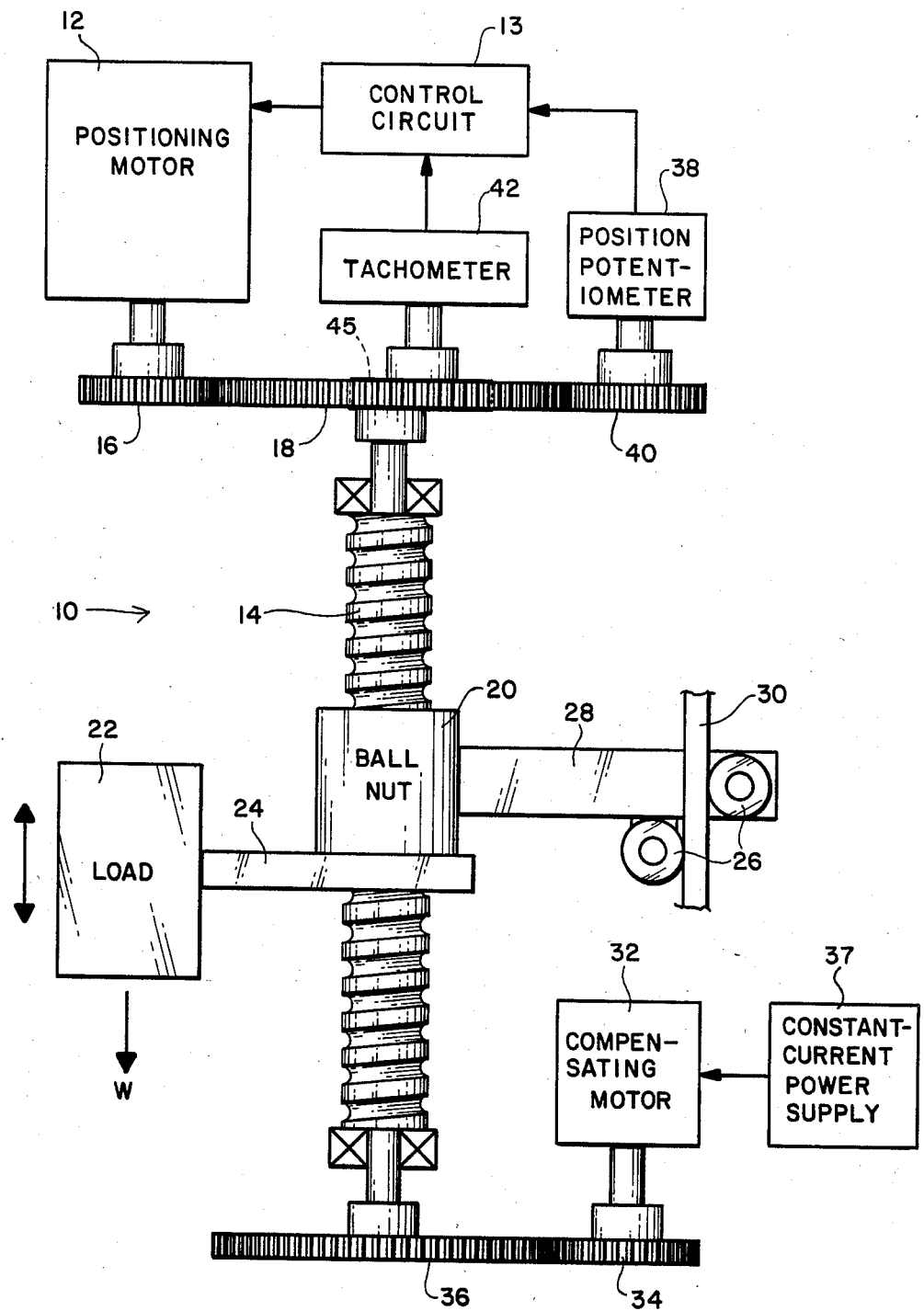
FIG. 1 is a diagrammatic side view of a load positioning system in accordance with the invention.

Turning now to the drawings, more particularly to FIG. 1, there is shown a load positioning system which includes gravity compensation in accordance with the invention. The output shaft of motor 12 is coupled to lead screw 14 by means of meshing gears 16 and 18. A conventional control circuit 13 controls the rate and direction of rotation of the output shaft of motor 12. It is preferred that positioning motor 12 be a part of a conventional closed-loop servo system wherein feedback signals representative of lead screw position and rate data are generated by transducers such as position potentiometer 38 and tachometer 42, respectively. Position potentiometer 38 is coupled to the lead screw by means of gears 18 and 40 and tachometer 42 is coupled to lead screw 14 by meshing gears 18 and 45.

As lead screw 14 is rotated, ball nut 20 traverses to and fro along the lead screw. For one direction of rotation of lead screw 14, ball nut 20 moves upward, that is, in the direction toward gear 18. Conversely, when the lead screw is rotated in the opposite direction, the ball nut 20 moves downward and away from gear 18. Load 22 is fixedly attached to the ball nut 20 by member 24. Rollers 26 are attached to ball nut 20 by member 28 and engage guide member 30 to prevent cocking forces being applied to the ball nut during traversal on lead screw 14. The force w of gravity on load 22 applies a constant torque to lead screw 14 and tends to cause it to rotate. A motor 32 is coupled to lead screw 14 by means of engaging gears 34 and 36 to provide an equal and opposite torque to lead screw 14 to compensate for the gravity induced torque applied to the lead screw 14 by load 22. Although the compensating motor 32 is shown depicted coupled to the end of lead screw 14 opposite motor 12, it is to be understood that both motors may be coupled to either end of lead screw 14 or that the positions of the motors may be reversed (motor 32 at the upper end of lead screw and motor 12 at the lower end). The gearing for motor 32 is chosen to give a torque multiplication ratio to enable the use of a minimum size motor and minimum power supply. Also the motor dynamics and gear ratio combination is chosen so that the motor rotor and gears will accelerate at a sufficiently high rate to keep motor 12 from driving motor 32.

Figure 2:
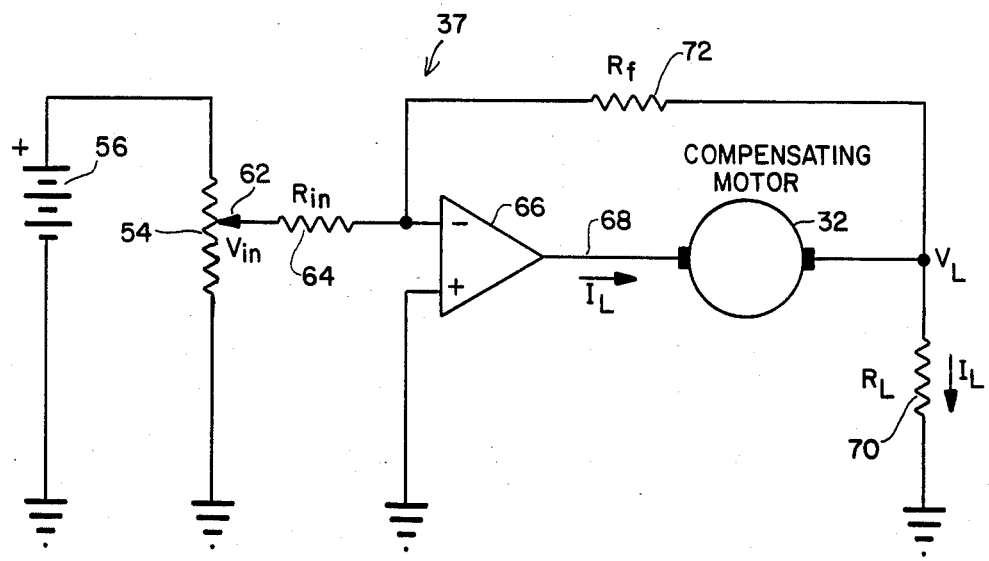
FIG. 2 is a schematic diagram of a power supply circuit used in the system of FIG. 1.

The torque produced by a DC motor is proportional to the field flux and the armature current. There are many DC motors that have a constant flux and thus produce a torque directly proportional to the armature current. When the armature current is constant then the torque is constant. Shunt motors, permanent magnet motors, servomotors and torque motors are some of the types of DC motors that display these characteristics. In the preferred embodiment, motor 32 is such a motor supplied by a constant-current power supply 37. FIG. 2 shows a typical power supply circuit 37 for supplying a constant current $I_L$ to compensating motor 32 for different loads 22. A variable resistor 54 is connected in shunt with a DC voltage source 56. Input resistor 64 ($R_{in}$) is connected between the wiper contact 62 of potentiometer 54 and the inverting input of power amplifier 66. The output of amplifier 66 is connected to one terminal of motor 32 by line 68 whereas the other motor terminal is connected to the node formed by resistors 70 ($R_L$) and 72 ($R_f$). One terminal of feedback resistor $R_f$ is connected to the inverting input of amplifier 66 and one terminal of resistor $R_L$ is grounded. The non-inverting input of amplifier 66 is grounded. The motor current $I_L$ supplied by circuit 37 to DC motor 32 is defined by the equation $$I_L = V_{in}\left(-\frac{R_F}{R_{in}} \cdot \frac{1}{R_L}\right) \text{ where } R_f >> R_L$$

In accordance with operational amplifier principles, if $V_{in}$ and $R_L$ remain constant, voltage $V_L$ will remain constant and the current through the motor 32 will remain constant. The voltage $V_{in}$ is selected by moving wiper 62 and is chosen to produce the necessary compensating torque for a particular load 22.

In one specific embodiment of the invention the load 22 was a ship model for use in an aircraft simulator of the type disclosed in commonly assigned U.S. Pat. No. 4,055,004, Chase, Oct. 25, 1977. The ship had six degrees of freedom and the simulator trainee could practice landing an aircraft on the flight deck of a moving ship. The transversal of ball nut 20 along lead screw 14 accomplished ship motion along one axis of freedom. In that embodiment, wherein the load 22 had a weight of 4.5 pounds, the positioning motor 12 was implemented with an Inland DC motor type OT-0735 having a continuous stall torque of 6.3 ounce-inches, and compensating motor 32 was implemented with an Inland DC motor type NT-0726 having a continuous stall torque of 2.9 ounce-inches and a volume of approximately one cubic inch. These motors may be obtained from Inland Motor Specialty Products Division, Kollmorgen Corporation, Redford, VA 24141. The power amplifier 66 used for this embodiment was an Intersil ICH8510 manufactured by Intersil, Inc., Cupertino, Calif. Other parameters of system 10 were as follows:

| Element | Parameter |
| --- | --- |
| Lead screw 14 | 8 threads per inch |
| Gear 16 | 42 teeth |
| Gear 18 | 42 teeth |
| Gear 34 | 42 teeth |
| Gear 36 | 200 teeth |
| Gear 40 | 140 teeth |
| Gear 45 | 28 teeth |

From FIG. 1 it is apparent that load 22 follows a linear path parallel to lead screw 14. The invention may also be employed to compensate for the force of gravity on a load that is angularly positioned.

Figure 3:
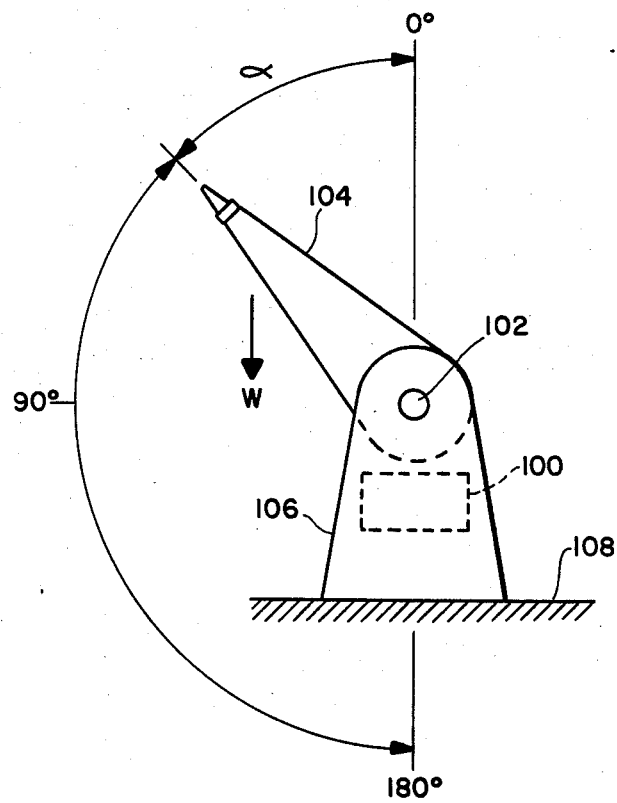
FIG. 3 is a diagrammatic side view of another embodiment of a load positioning system in accordance with the invention.

FIG. 3 is a diagrammatic representation of a second embodiment of the present invention. A load 104, a robotic arm, is supported by base 106 and caused to rotate about pivot 102 by positioning system 100 that includes two motors similar to those employed in system 10. A primary motor rotates load 104 about pivot 102 while a gravity compensating motor generates a torque equal and opposite to the torque produced by gravity force w. Load 104 is continually subjected to gravity force w; however, as the load 104 is rotated from $\alpha = 0°$ to $\alpha = 90°$ (where $\alpha$ is the angle between the arm and the vertical plane) there is a substantial change in the torque applied to the pivot by load 104. The secondary motor, the gravity compensating motor, alters its torque output as angle $\alpha$ is changed.

Figure 4:
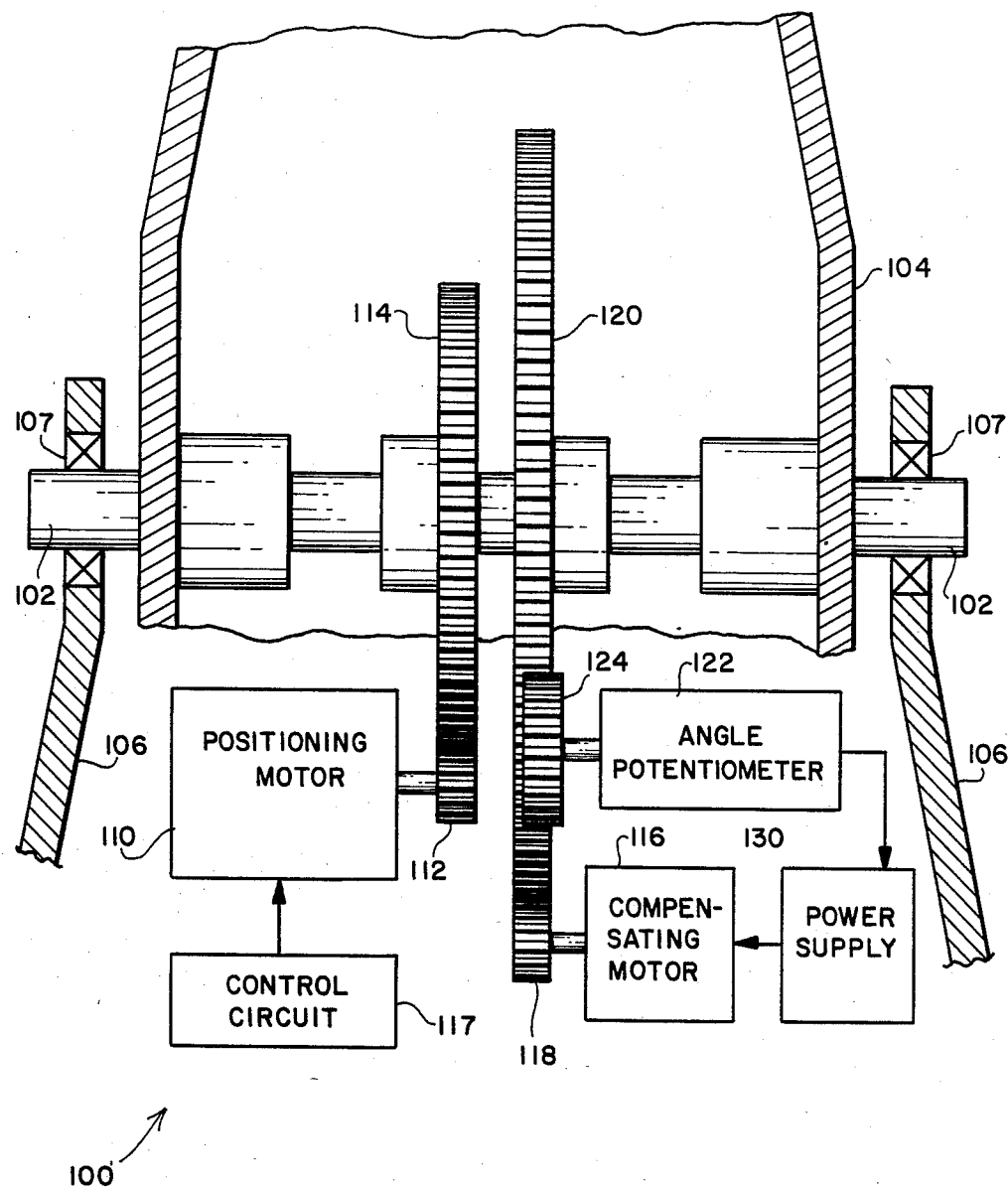
FIG. 4 is a front view showing more detail of the positioning system of FIG. 3.

FIG. 4 is a front view of robotic arm 104 showing the details of positioning system 100. Pivot 102, a shaft, is supported at each end by a bearing 107 and the bearings are in turn supported by stand 106. Positioning motor 110 is mechanically coupled to pivot 102 by intermeshing gears 112 and 114. The rate and direction of rotation of positioning motor 110 is controlled by a conventional motor control circuit 117. A gravity-compensating DC motor 116 of the same type as motor 32 is coupled to pivot 102 by gears 118 and 120 and angle potentiometer 122 is coupled to pivot 102 by gears 120 and 124. As positioning motor 110 rotates, load 104 turns about pivot 102. Positioning motor 110 may be, for example, a servo motor in a conventional closed-loop system servo system having negative feedback signals generated by a position potentiometer and tachometer (not shown).

Figure 5:
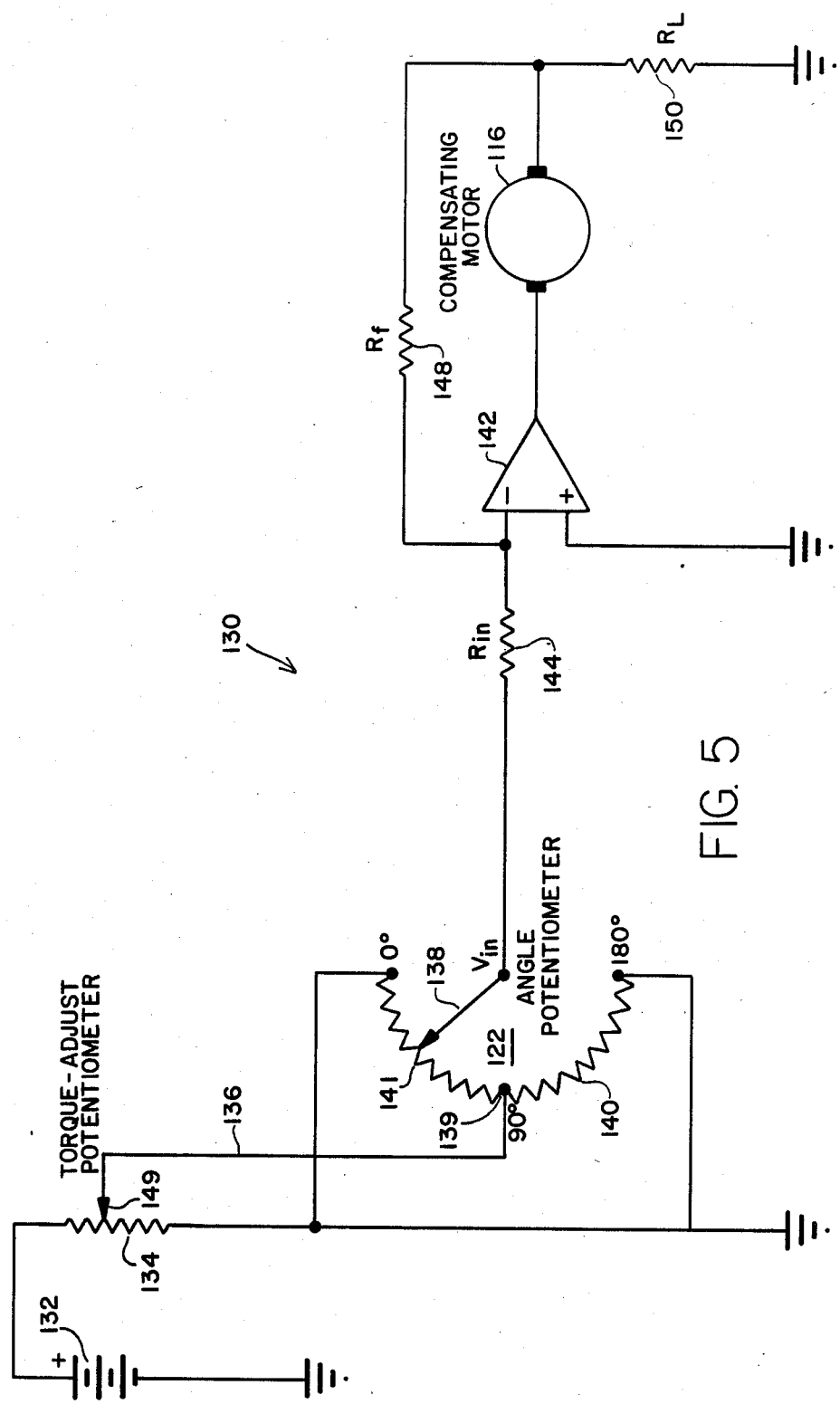
FIG. 5 is a schematic diagram of a circuit used in the load positioning system of FIGS. 3 and 4.

FIG. 5 depicts a circuit 130 for supplying current to gravity-compensating motor 116. A potentiometer 134 employed for torque adjustment purposes is connected in parallel with a DC voltage source 132. Angle potentiometer 122 has a wiper 138 and a centertap terminal 139 coinciding with 90° rotation of wiper 138. The resistance elements 140 and 141 each have a sine taper. Wiper 149 of torque-adjust potentiometer 134 is connected to centertap 139 by line 136. A resistor 144 ($R_{in}$) is connected between wiper 138 and the inverting input of power amplifier 142. The terminals of compensating motor 116 are connected to the output of amplifier 142 and the node formed by resistors 148 ($R_f$) and 150 ($R_L$), respectively. One terminal of feedback resistor 148 is connected to the inverting input of amplifier 142 and one terminal of resistor $R_L$ is grounded, as is the non-inverting input of amplifier 142.

The wiper 138 of potentiometer 122 is mechanically aligned to be at centertap 139 when $\alpha = 90°$. The wiper 149 of potentiometer 134 is adjusted so that the torque supplied by motor 116 will be equal and opposite to the torque induced by gravity when $\alpha = 90°$ and wiper 138 of potentiometer 122 is at centertap 139 (90°). The input voltage $V_{in}$ supplied by angle potentiometer 122 is equal to the voltage at centertap 139 multiplied by the sine of angle $\alpha$. $V_{in}$ is therefore at a maximum when $\alpha = 90°$ (the load 102 is parallel to ground 108) and zero when $\alpha = 0°$ or 180° (the load 104 is normal to ground 108). Thus as the load 104 is positioned about pivot 102, the wiper 138 of potentiometer 122 is slewed and the value of $V_{in}$ is such that compensating motor 116 applies a torque to pivot 102 that is equal and opposite to the torque applied to load 104 by gravity. Circuit 130 provides for up to 180° rotation of load 104. In situations requiring 360° rotation of load 104 it would merely be necessary to couple a second potentiometer, similar to potentiometer 122, to the shaft of potentiometer 122, connecting both in the same manner. The additional potentiometer would be staggered 180° with respect to potentiometer. It is to be understood that a potentiometer is only one of several position/angle sensing transducers that could be used for positioning system 100.

As a result of the compensating torques provided by systems 10 and 100, the positioning motors 12 and 110 act against a constant load regardless of the position of load 22 or load 104. With the gravity forces equilibrated by motors 32, 116, the positioning motors 12, 110 are therefore capable of providing symmetrical acceleration and velocity performance, with a minimum of static and dynamic errors. The gravity compensation is achieved through the use of apparatus that is economical, light weight and compact.

While I have illustrated and described the preferred embodiments of my invention, it is to be understood that I do not limit myself to the precise constructions herein disclosed and that various changes and modifications may be made within the scope of the invention as defined in the appended claims.

I claim:

1. A load positioning system for moving a load in a first direction and a second direction in the vertical plane subjected to the force of gravity comprising first motor means for moving said load in the first and second directions, means for mechanically coupling said first motor means to said load, said force of gravity on said load inducing a torque on said coupling means, and a second motor means coupled to said coupling means for applying a torque equal and opposite to said gravity induced torque, said second motor means compensating for said force of gravity, so that acceleration and velocity of said load produced by said first motor means is symmetrical in the first and second directions.

2. A load positioning system as set forth in claim 1 wherein said second motor means includes a DC motor supplied by a constant-current source.

3. A load positioning system as defined in claim 2 wherein said load is moved in a linear path by said first motor means.

4. A load positioning system as described in claim 3 wherein said coupling means includes a lead screw that is rotated by said first motor means.

5. A load positioning system as in claim 1 wherein said load is angularly moved by said first motor means.

6. A load positioning system as set forth in claim 5 wherein the torque generated by the second motor means varies as a function of the angular orientation of the load.

* * * * *